US007972542B1

(12) United States Patent
Marks et al.

(10) Patent No.: US 7,972,542 B1
(45) Date of Patent: *Jul. 5, 2011

(54) LAYER BY LAYER SELF-ASSEMBLY OF LARGE RESPONSE MOLECULAR ELECTRO-OPTIC MATERIALS BY A DESILYLATION STRATEGY

(75) Inventors: Tobin J. Marks, Evanston, IL (US); Milko E. van der Boom, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/806,560

(22) Filed: Aug. 16, 2010

Related U.S. Application Data

(60) Continuation of application No. 12/352,792, filed on Jan. 13, 2009, now Pat. No. 7,776,235, which is a continuation of application No. 11/054,962, filed on Feb. 10, 2005, now Pat. No. 7,476,345, which is a division of application No. 09/815,951, filed on Mar. 22, 2001, now Pat. No. 6,855,274.

(60) Provisional application No. 60/191,360, filed on Mar. 22, 2000.

(51) Int. Cl.
*F21V 9/00* (2006.01)
*G02B 6/10* (2006.01)
*G02C 7/00* (2006.01)

(52) U.S. Cl. ........ 252/586; 252/582; 359/246; 359/321; 385/131; 428/447

(58) Field of Classification Search .................. 252/586, 252/582; 359/246, 321; 385/131; 428/447
See application file for complete search history.

(56) References Cited

U.S. PATENT DOCUMENTS

| | | | |
|---|---|---|---|
| 4,720,432 A | 1/1988 | VanSlyke et al. | |
| 5,156,918 A | 10/1992 | Marks et al. | |
| 5,276,381 A | 1/1994 | Wakimoto et al. | |
| 5,834,100 A | 11/1998 | Marks et al. | |
| 5,965,718 A | 10/1999 | Nicolaou et al. | |
| 6,033,773 A | 3/2000 | Yang et al. | |
| 6,033,774 A | 3/2000 | Yitzchaik et al. | |
| 6,165,383 A | 12/2000 | Chou | |
| 6,348,992 B1 | 2/2002 | Zhang et al. | |
| 6,361,717 B1 | 3/2002 | Dalton et al. | |
| 6,399,221 B1 | 6/2002 | Marks et al. | |
| 6,549,685 B2 | 4/2003 | Marks et al. | |
| 6,652,779 B1 | 11/2003 | Zhang et al. | |
| 6,855,274 B1 | 2/2005 | Marks et al. | |
| 2003/0162053 A1 | 8/2003 | Marks et al. | |
| 2004/0092195 A1 | 5/2004 | Marks et al. | |

OTHER PUBLICATIONS

Wenbin Lin et al., Supramolecular Approaches to Second-Order Nonlinear Optical Materials. Self-Assembly and Microstructural Characterization of Intrinsically Acentric [(Aminophenyl)azo]pyridinium Superlattices, J. Am. Chem. Soc., 1996, 118, 8034-8042.*
Wasserman Sr; Tao Y-T; Whitesides GM. Structure and Reactivity of Alkylsiloxane Monolayers Formed by Reaction of Alkyltrichlorosilanes on Silicon Substrates. Langmuir 1989, vol. 5, No. 4, pp. 1074-1087.
Neff GA; Page CJ, et al. Hydrolysis of Surface-Bound Phosphonate Esters for the Self-Assembly of Multilayer Films: Use of Solid State Magic Angle Spinning 31P NMR as a Probe of Reactions on Surfaces. Langmuir 1996, vol. 12, No. 2, pp. 238-242.
Collins. RJ; Bae IT; Scherson DA; Sukenik CN. Photocontrolled Formation of Hydroxyl-Bearing Monolayers and Multilayers. Langmuir 1996, vol. 12, No. 23, pp. 5509-5511.
Maoz R; Matlis S; Dimasi E; Ocko BM; Sagiv J. Self-replicating amphiphilic monolayers. Nature, vol. 384, Nov. 14, 1996, pp. 150-153.
Armstrong JA; Bloembergen N; Ducuing J; Pershan PS. Interactions between Light Waves in a Nonlinear Dielectric. Physical Review, vol. 127, No. 6, Sep. 15, 1962, pp. 1918-1939.
Pomerantz M; Segmüller A; Netzer L; Sagiv, J. Coverage of Si Substrates by Self-Assembling Monolayers and Multilayers as Measured by IR, Wettability and X-Ray Diffraction. Thin Solid Films, 132 (1985) pp. 153-162.
Shelton DP; Rice JE. Measurements and Calculations of the Hyperpolarizabilities of Atoms and Small Molecules in the Gas Phase. Chem. Rev., vol. 94, 1994, pp. 3-29.
Burland DM; Miller RD; Walsh CA. Second-Order Nonlinearity in Poled-Polymer Systems. Chem. Rev., 1994 vol. 94, No. 1, pp. 31-75.
Zyss J; Ledoux I. Nonlinear Optics in Multipolar Media: Theory and Experiments. Chem. Rev. 1994, vol. 94, No. 1, pp. 77-105.
Corn RM; Higgins DA. Optical Second Harmonic Generation as a Probe of Surface Chemistry. Chem. Rev. 1994, vol. 94, No. 1, pp. 107-125.
Moerner WE; Silence SM. Polymer Photorefractive Materials. Chem. Rev. 1994 vol. 94, No. 1, pp. 127-155.
Dhar L; Rogers JA; Nelson KA. Time-Resolved Vibrational Spectroscopy in the Impulsive Limit. Chem. Rev. 1994, vol. 94, No. 1, pp. 157-193.
Kanis DR; Ratner MA; Marks TJ. Design and Construction of Molecular Assemblies with Large Second-Order Optical Nonlinearities. Quantum Chemical Aspects. Chem. Rev. 1994, vol. 94, No. 1, pp. 195-242.
Brédas JL; Adant C; Tackx P; Persoons A; Pierce BM. Third-Order Nonlinear Optical Response in Organic Materials: Theoretical and Experimental Aspects. Chem. Rev. 1994, vol. 94, No. 1, pp. 243-278.
Burland DM. Optical Nonlinearities in Chemistry: Introduction. Chem. Rev. 1994, vol. 94, No. 1, pp. 1-2.
Malik A; Lin W; Durbin MK; Marks TJ; Dutta P. Specular x-ray reflectivity studies of microstructure and ordering in self-assembled multilayers. J. Chem. Phys., vol. 107, No. 2, Jul. 8, 1997, pp. 645-652.
Yitzchaik S; Roscoe SB; Kakkar AK; Allan DS; Marks TJ; Xu Z; Zhang T; Lin W; Wong GK. Chromophoric Self-Assembled NLO Multilayer Materials. Real Time Observation of Monolayer Growth and Microstructural Evolution by in Situ Second Harmonic Generation Techniques. J. Phys. Chem., vol. 97, No. 27, 1993, pp. 6958-6960.

(Continued)

*Primary Examiner* — Timothy J. Kugel

(74) *Attorney, Agent, or Firm* — Reinhart Boerner Van Deuren s.c.

(57) ABSTRACT

The preparation of robust, thin film materials with large second-order optical nonlinearities through the covalent self-assembly of chromophoric compositions and innovative use of silyl chemistry.

20 Claims, 12 Drawing Sheets

OTHER PUBLICATIONS

Netzer L; Sagiv J. A New Approach to Construction of Artificial Monolayer Assemblies. J. Am. Chem. Soc., vol. 105, No. 3, 1983, pp. 674-676.

Katz HE; Bent SF; Wilson WI; Schilling ML; Ungashe SB. Synthesis, Layer Assembly, and Fluorescence Dynamics of Poly(phenylenevinylene) Oligomer Phosphonates. J. Am. Chem. Soc., vol. 116, No. 15, 1994, pp. 6631-6635.

Lin W; Lin W; Wong GK; Marks TJ. Supramolecular Approaches to Second-Order Nonlinear Optical Materials. Self-Assembly and Microstructural Characterization of Intrinsically Acentric [(Aminophenyl)azo]pyridinium Superlattices. J. Am. Chem. Soc. 1996, vol. 118, No. 34, pp. 8034-8042.

Maoz R; Sagiv J. Penetration-Controlled Reactions in Organized Monolayer Assemblies. 2. Aqueous Permanganate Interaction with Self-Assembling Monolayers of Long-Chain Surfactants. Langmuir, vol. 3, No. 6, 1987, pp. 1045-1051.

Schumb WC; Stevens AJ. Partial Hydrolysis of Silicon Tetrachloride. Communications to the Editor. J. Am. Chem. Soc. 1947, vol. 69, p. 726.

* cited by examiner

All-Polymer Waveguide     Modular with Self-Assembled Superlattices

LAYER BY LAYER SELF-ASSEMBLY OF LARGE RESPONSE MOLECULAR ELECTRO-OPTIC MATERIALS BY A DESILYLATION STRATEGY

This application is a continuation of and claims priority benefit from application Ser. No. 12/352,792 filed Jan. 13, 2009 and now issued as U.S. Pat. No. 7,776,235 on Aug. 17, 2010, which is a continuation of and claims priority benefit from application Ser. No. 11/054,962 filed Feb. 10, 2005 and now issued as U.S. Pat. No. 7,476,345 on Jan. 13, 2009, which was a divisional of and claimed priority benefit from Ser. No. 09/815,951 filed Mar. 22, 2001, U.S. Pat. No. 6,855,274 issued on Feb. 15, 2005, which in turn claims priority benefit from provisional application Ser. No. 60/191,360, filed on Mar. 22, 2000, each of which is incorporated herein by reference in its entirety.

This invention was made with government support under Grant No. DMR 9632472 awarded by the National Science Foundation and Grant No. N00014-95-1-1219 awarded by the Office of Naval Research. The government has certain rights in the invention.

BACKGROUND OF THE INVENTION

Organic molecule-based optical technology components such as electro-optic modulators promise greatly increased rates of information transmission by enhancing network speed, capacity, and bandwidth for data networking and telecommunications. There is a vast need for increased data handling density in photonic devices, and future high-speed fiber-optic networks will be required to carry orders of magnitude more data than possible with conventional electronic systems and to easily handle phone calls, e-mail, webpages, video, and high-definition television (HDTV) signals. Therefore, the development of new electro-optic/second-order nonlinear optical (NLO) materials with excellent optical, thermal, and chemical properties is a topic of great current scientific interest. Of the synthetic approaches investigated, Langmuir-Blodgett (LB) film transfer, polymer poling, and self-assembly (SA) have been used to obtain soft thin films with a variety of electro-optic response properties.

Intrinsically acentric SA organic materials can exhibit far higher electro-optic coefficients and lower dielectric constants than established inorganic materials (e.g., lithium niobate and potassium dihydrogen phosphate), and do not require electric field poling. (For reviews see the *Chem. Rev.* special issue on *Optical Nonlinearities in Chemistry*, ed: D. M. Burland, 1994, 94, 1-278.) Chemisorptive siloxane SA was originally developed by Sagiv (R. Moaz, J. Sagiv, *Langmuir* 1987, 3, 1034-1044) and is known to yield robust, densely packed organic films on hydroxylated surfaces. Self-assembled mono- and multilayered structures are accessible with relatively simple hydro- or fluorocarbon chains (A. Ulman, *An Introduction to Ultrathin Organic Films: from Langmuir-Blodgett to Self-Assembly*, Academic Press, Inc. San Diego, 1991), whereas fabrication of complex superlattices is relatively rare. For instance, Katz, et al. reported the formation of acentric multilayers by alternately depositing layers of phosphonate-substituted azo chromophores and zirconyl salts. (H. E. Katz, W. L., Wilson, G. Scheller, *J. Am. Chem. Soc.*, 1994, 116, 6636-6640.)

Previous studies showed that robust, acentric mono- and multilayered structures composed of stilbazolium and related chromophores (See, FIGS. 1A-C) and exhibiting very large NLO response properties ($\chi^{(2)}$=150-200 pm/V) can be obtained by a three-step procedure, the second of which involves a cumbersome spin-coating of chromophore solutions, followed by vacuum oven treatment. The synthetic tools available for the formation of surface-bound functional organic multilayered structures are rather limited in comparison to the tremendous variety of reactions known in solution phase organic chemistry.

Organic monolayers containing nonpolar end-groups are chemically inert towards binding of chloro- or alkoxy silanes from the solution phase. However, regeneration of a new reactive hydroxylated or carboxylated surface is an essential requirement for the iterative growth of siloxane-based multilayers. In order to form highly ordered multilayered structures, a constant and/or a large density of reactive sites must be present at the surface of each added layer. To this end, it was recently demonstrated that 9-fluorenylmethoxycarbonyl (Fmoc) and di-p-methoxytrityl (DMT) groups can be used for the reversible protection of amine and hydroxyl-terminated alkanethiol monolayers on gold substrates. (Frutos, J. M. Brockman, R. M. Corn, *Langmuir* 2000, in press.) Hydroboration or oxidation of terminal double bonds (L. Netzer, J. Sagiv, *J. Am. Chem. Soc.* 1983, 105, 674-676; R. Moaz, S. Matlis, E. DiMasi, B. M. Ocko, J. Sagiv, *Nature* 1996, 384, 150), hydrolysis of phosphonate esters (G. A. Neff, C. J. Page, E. Meintjes, T. Tsuda, W. C. Pilgrim, N. Roberts, W. W. Warren, Jr., *Langmuir* 1996, 12, 238-242), reduction of methyl esters (S. R. Wasserman, Y. T. Tao, G. M. Whitesides, *Langmuir* 1989, 5, 1074-1087; M. Pomerantz, A. Segmuller, L. Netzer, L. Sagiv, *J. Thin Solid Films* 1985, 132, 153-162), and photolysis of organic thin films (R. J. Collins, I. T. Bae, D. A. Scherson, C. N. Sukenik, *Langmuir* 1996, 12, 5509-5111) have also been used to create hydroxyl-terminated surfaces.

SUMMARY OF THE INVENTION

In light of the foregoing, it is an object of the present invention to provide chromophores, non-linear optic materials and/or integrated devices and methods for the production and/or assembly of such chromophores, materials and devices, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide a new, efficient self-assembly technique to prepare electro-optic materials that can be used for the growth of robust, intrinsically polar arrays of covalently bound high-hyper-polarizability ($\beta$) chromophores directly on silicon or other suitable substrates, so as to allow formation of a variety of electro-optic and related integrated devices. Accordingly, it can also be an object of the present invention to integrate the chromophores, composition, films and/or materials of this invention into device type structures such as planar waveguides (for frequency doubling) and electro-optical modulators.

It can also be an object of the present invention to integrate a wet chemical approach into a straightforward methodology for the self-assembly of large response electro-optic superlattices.

It can also be an object of the present invention to provide second-order chromophoric thin films, as can be constructed with sub-nanometer level control of layer dimension, with microstructural acentricity preserved, layer by layer, during self-assembly.

Other objects, features, benefits and advantages of the present invention will be apparent from this summary and its descriptions of various preferred embodiments, and will be readily apparent to those skilled in the art having knowledge of various non-linear optic materials, devices and assembly/production techniques. Such objects, features, benefits and advantages will be apparent from the above as taken into conjunction with the accompanying examples, data, figures and all reasonable inferences to be drawn therefrom, alone or with consideration of the references incorporated herein.

In part, the present invention is a method of using silyl chemistry to control the reactivity of a self-assembled molecular electro-optic material. The method includes (i) providing an electro-optic material having a silyl-derivatized chromophore; (ii) desilylating the chromophore to generate terminal hydroxy functionalities, and (iii) reacting the hydroxy functionalities with a reagent having at least one silicon moiety. In preferred embodiments, the chromophore is a high-β chromophore and/or is derivatized with a trialkylsilyl protecting group. Such protecting groups useful with the present invention are limited only by the availability of the corresponding silane precursor compound and/or the effectiveness of the resulting protecting group in the self-assembly procedures described herein. Effectiveness is, in part, based on the deprotection of the hydroxy functionality and removal of the protecting group. Various deprotecting agents are available and would be well known to those skilled in the art of silyl chemistry and its integration into the present invention. Preferably, anionic fluoride reagents can be used with good effect, in particular quaternary ammonium fluoride reagents.

In part, the present invention is also a method of using silyl chemistry to generate a hydrophilic surface for molecular self-assembly of an electro-optic material. Such a method includes (i) providing an electro-optic material comprising a high-β chromophore film with terminal trialkylsiloxy moieties, (ii) desilylating the film to generate terminal hydroxy functional groups, and (iii) reacting the terminal hydroxy functional groups with a siloxane capping agent. With reference to the discussion, above, the trialkylsiloxy moieties correspond to the aforementioned silyl protecting groups and are derived from the appropriate silane reagents upon reaction with the chromophore material. Desilylation can be achieved as discussed elsewhere, with the resultant terminal hydroxy groups reactive with a reagent having at least one silicon moiety. In preferred embodiments, such a reagent is a siloxane. Octachlorotrisiloxane is an especially preferred siloxane capping agent, but other molecular components can be used with similar effect. Such components include, without limitation, the bifunctional silicon compounds described in U.S. Pat. No. 5,156,918, at column 7 and elsewhere therein, incorporated by reference herein in its entirety. Other useful components, in accordance with this invention include those trifunctional compounds which cross-link upon curing. Reaction between the terminal hydroxy groups and the capping agent provides a siloxane bond sequence between the chromophore film/layer and capping layer.

Deprotection of a chromophore followed by coupling with a capping agent provides a siloxane bonded bilayer. Sequential repetition of this synthetic sequence can be used as a method for assembling a multi-layered non-linear optical material. With an initial chromophore layer coupled to a suitable substrate, the resulting plurality of bilayers can be incorporated into a waveguide device. Such devices and related integrated device structures can be prepared as described herein or as, otherwise provided in U.S. Pat. No. 6,033,774 (and in particular columns 15-16 and FIGS. 6a-6d thereof), incorporated by reference herein in its entirety.

In part, the present invention is also a chromophore composition and/or material with non-linear optical properties. Such a composition has the structural formula $(Ch)XR_n$, wherein $(Ch)X$ is a chromophore substructure and X is a heteroatom, R is a trialkylsiloxyalkyl moiety and $_n$ is the number of moieties meeting the valence requirement of the corresponding heteroatom. Preferably, the heteroatom is oxygen or nitrogen, but can be any electron-rich heteroatom. Likewise, in preferred embodiments, the chromophore compositions of this invention include and can be represented by any of the structural formulas provided herein. See, in particular, the formulas of FIGS. 1, 2, 11 and 15. With respect to the latter, such substructures can be modified as described herein to provide the inventive chromophore structures. Furthermore, the silyl chemistry of this invention can be applied to other chromophore systems (e.g., FIG. 1) known in the art, such systems synthetically modified as necessary by well-known procedures to take advantage of the self-assembly strategies described herein. For example, various other systems known in the art are described in U.S. Pat. Nos. 5,156,918, 5,834,100 and 6,033,774, each of which is incorporated herein by reference in its entirety, but especially with regard to each respective discussion of the corresponding chromophore and/or conductive molecular components.

In summary, the present invention is a new deposition approach for assembly of covalently bound thin organic films having excellent electro-optic response properties. In particular, the solution-phase protection-deprotection of hydroxyl groups as TBDMS derivatives has found widespread use in organic chemistry but hereto for has not been used as described herein. The selective desilylation of silyl-protected surface functional groups to generate moderately hydrophilic surfaces represents a new application of such protection agents, useful in the efficient assembly of functional, siloxane-based multilayered electro-optic structures. Moreover, as discussed below, UV-vis, XRR, and SHG measurements clearly show that robust second-order chromophoric thin films can be constructed with sub-nm level control of layer dimension and microstructural acentricity completely preserved as layer-by-layer SA progresses.

The noncentrosymmetric alignment of the high-β chromophores separated by a thin polysiloxane film in each identical layer of the superlattice results in very high second-order electro-optic response, competitive with that of the highest efficiency chromophoric LB films and poled polymers. Importantly, electric-field poling is unnecessary to establish bulk second-order nonlinearity, suggesting greatly simplified device fabrication. (Neither electric field poling, poling electrodes, nor electrically matched buffer layers are required). The inventive protection-deprotection layer-by-layer SA strategy can be applied to other chromophore components including high-β heterocylic chromophores, such components as would be known to those skilled in the art, and subsequently toward the integration of such SA materials into device structures.

BRIEF DESCRIPTIONS OF THE DRAWINGS

FIGS. 4a-c show Linear dependence with the number of bilayers of three physical properties of the chromophoric superlattices: (a) Transmission optical absorbance (abs; arbitrary units) at 2=580 nm. (b) Thickness (d) in A derived from specular X-ray reflectivity measurements. (c) Square root of the 532 nm SHG intensity (I$^{2\omega}$; arbitrary units).

Figure 5:
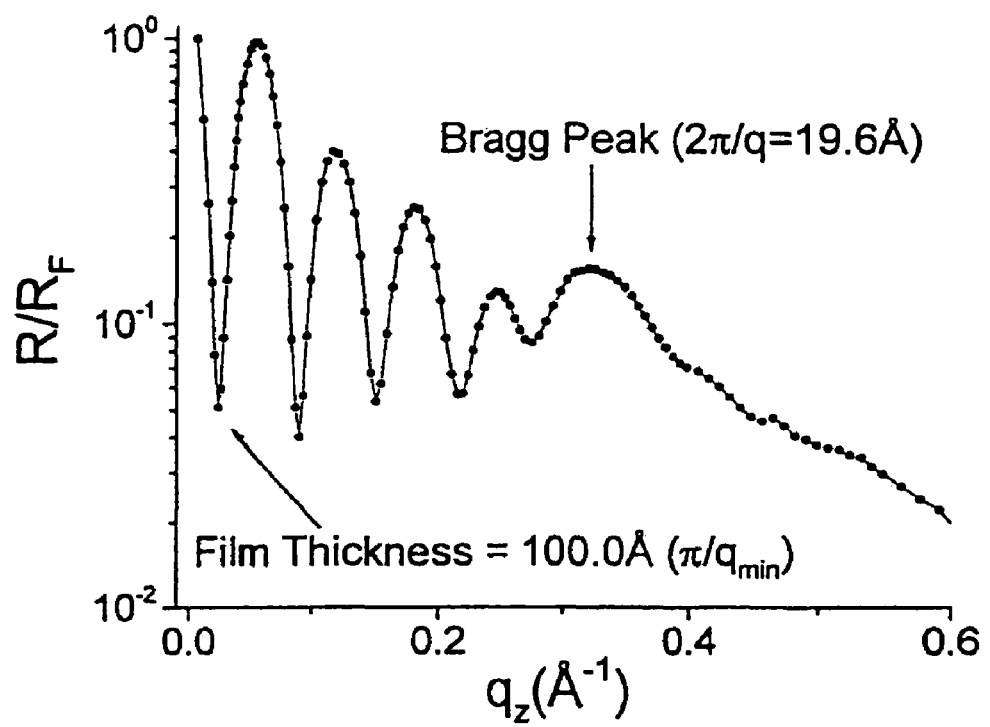

FIG. 5 provides normalized X-ray reflectance plotted versus wave vector for a sample with 5 layers.

Figure 6:
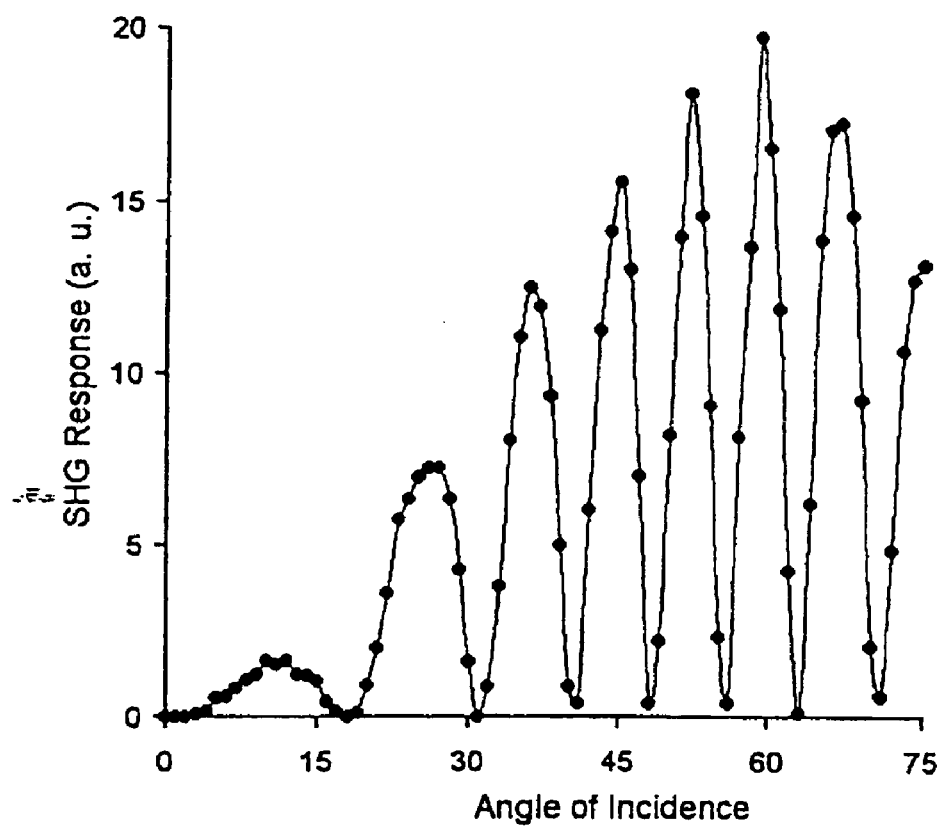

FIG. 6 plots SHG intensity as a function of fundamental beam incident angle from a float glass slide having a SA multilayer (n=5) on either side.

Figure 1:
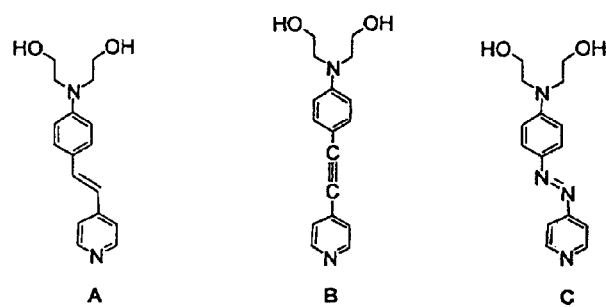
FIG. 1 shows structures of stilbazolium (1A) and related high β-chromophores (1B-C) of the type which can be silylated and used in conjunction with the methods of this invention.
Figure 2:
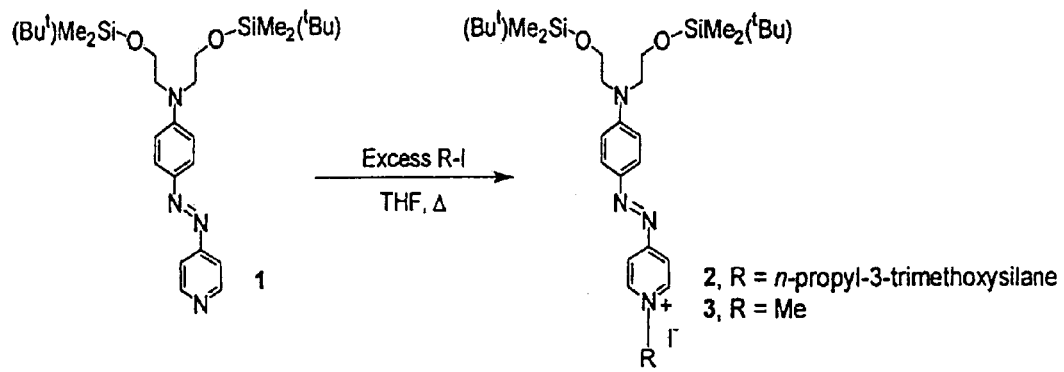
FIG. 2 shows the reaction of the chromophore precursor 1A with excess of 1-iodo-n-propyl-3-trimethoxysilane or MeI in dry THF at 90° C. to give 2A and 3A, respectively.
Figure 7:
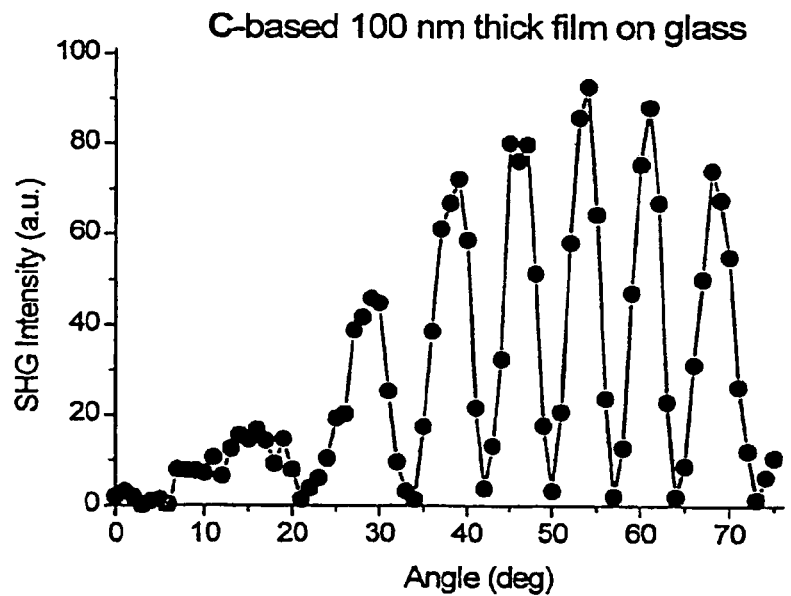

FIG. 7 shows a characteristic second harmonic generation (SHG) interference pattern, as demonstrated with a 100 nm-thick C-based film (FIGS. 1 and 2).

Figure 8:
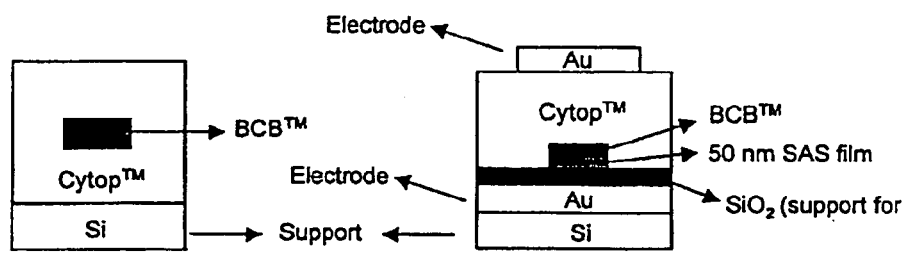

FIG. 8 compares, schematically, integration of large response electro-optic materials into device structures.

Figure 9:
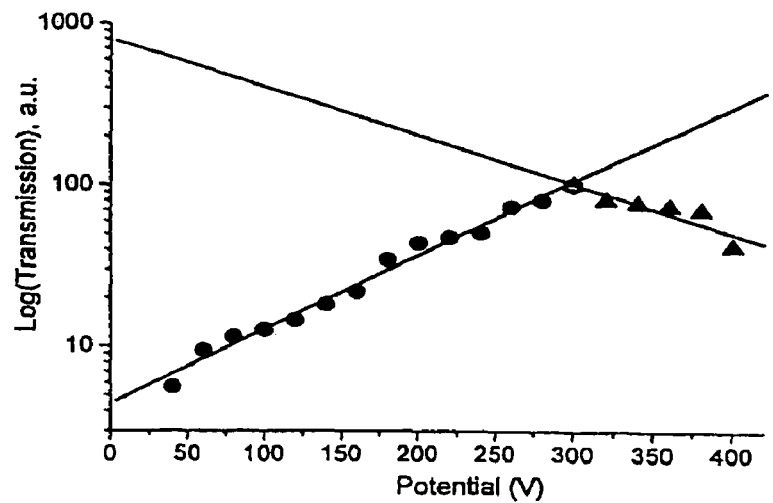

FIG. 9 illustrates electro-optic modulation with a C-based 50 nm thick film of this invention (see, also, FIGS. 1 and 2).

Figure 10:
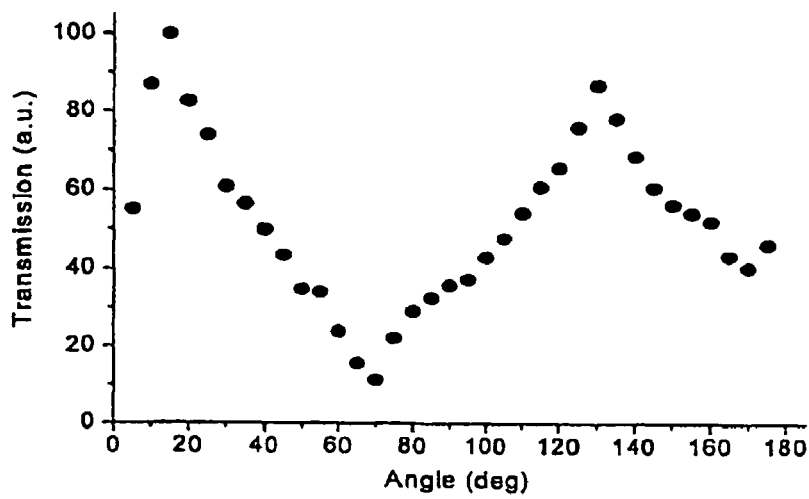

FIG. 10 demonstrates the transparency of the prototype electro-optic modulator of the type illustrated in FIG. 8.

Figure 11:
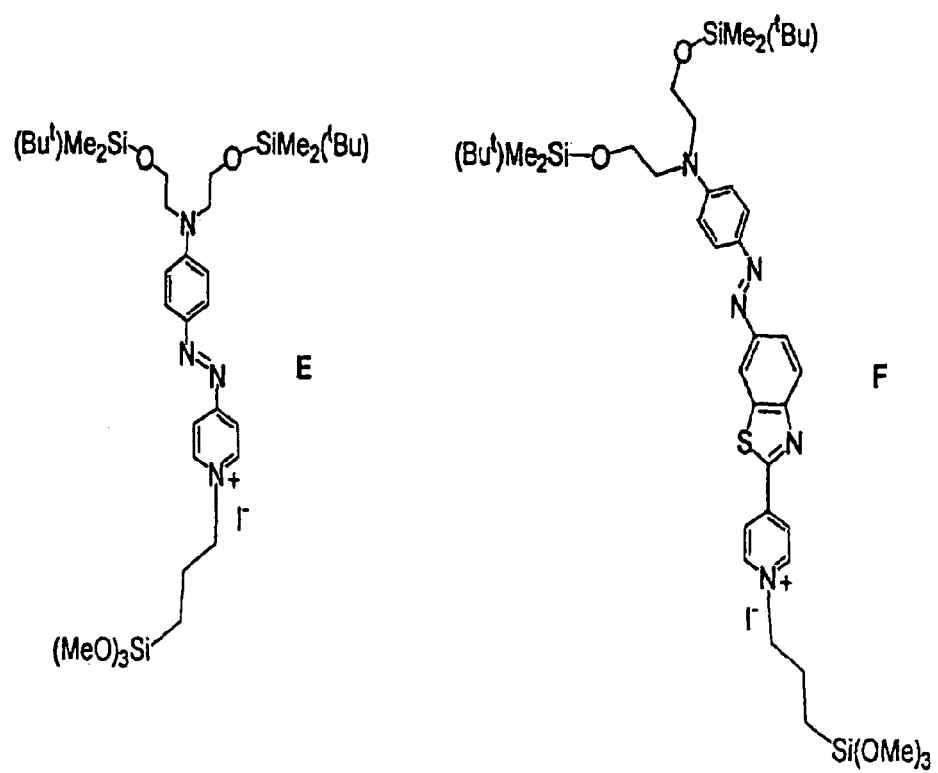

FIG. 11 shows, structurally, other chromophores of the type which can be devised in accordance with the present invention and used with the methods described herein.

Figure 12:
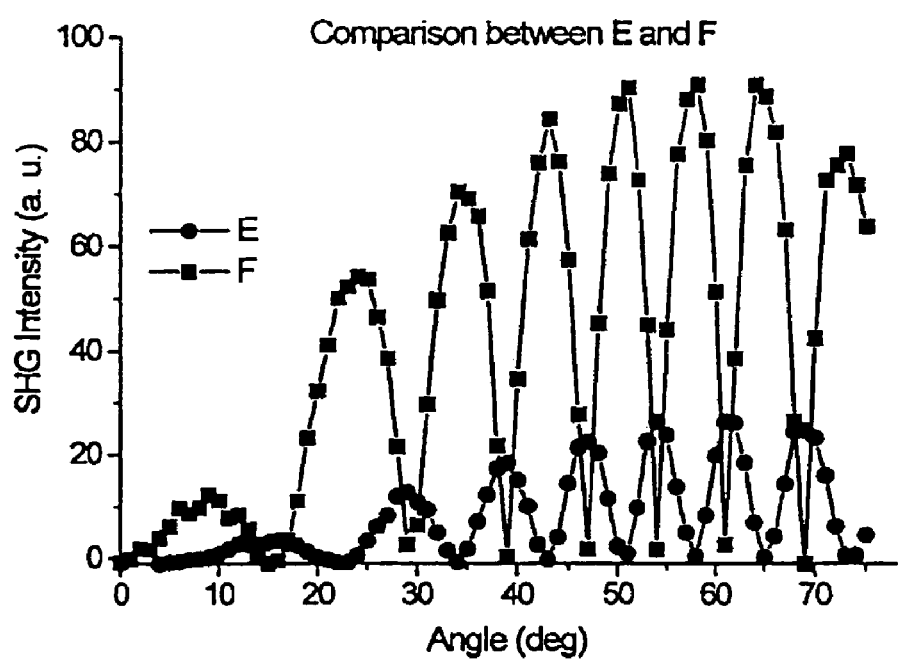

FIG. 12 compares, with reference to FIG. 11, characteristic second harmonic generation (SHG) interference pattern for E and F-based films.

Figure 13:
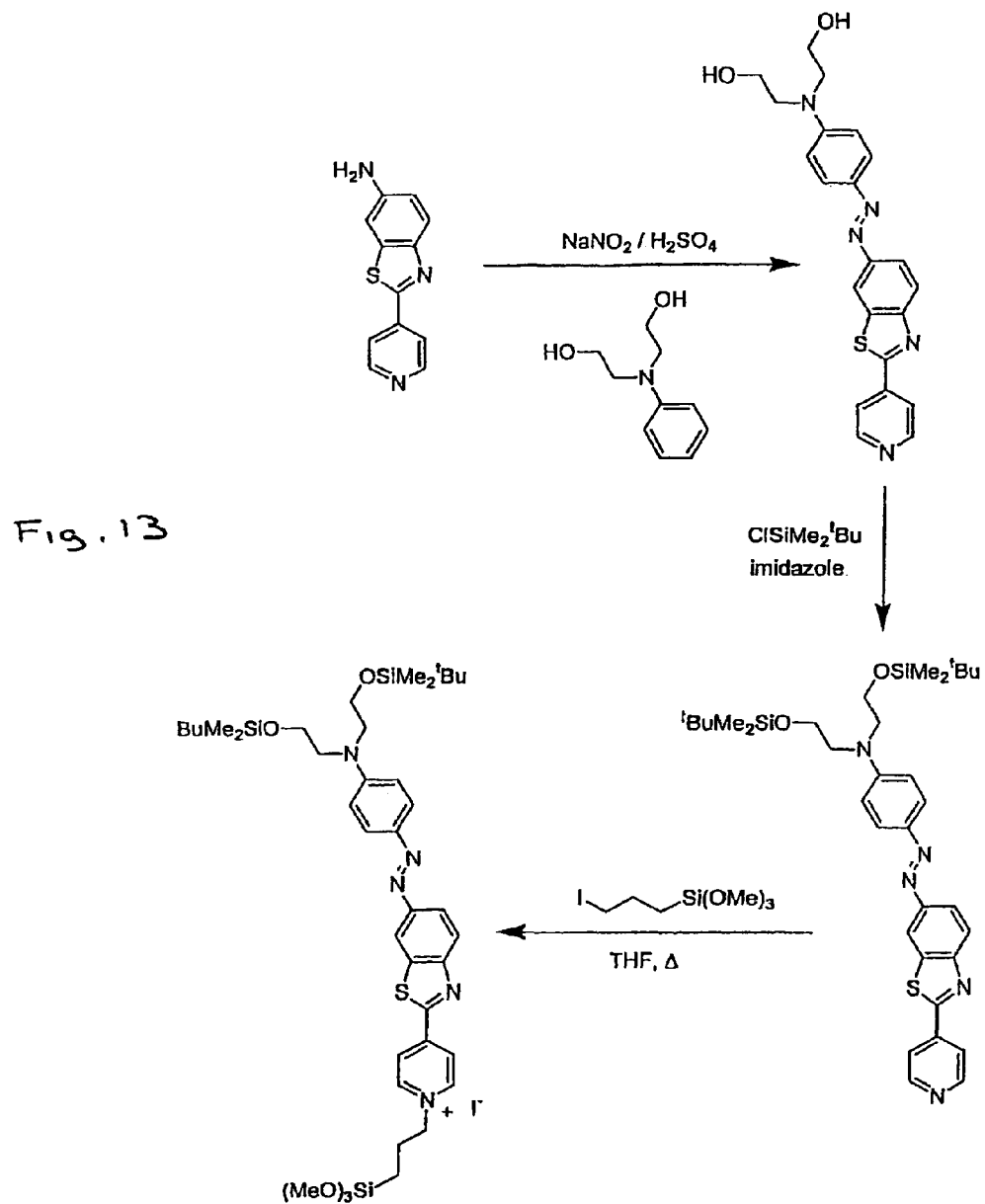

FIG. 13 illustrates a synthetic procedure enroute to chromophore F of FIG. 11.

Figure 14:
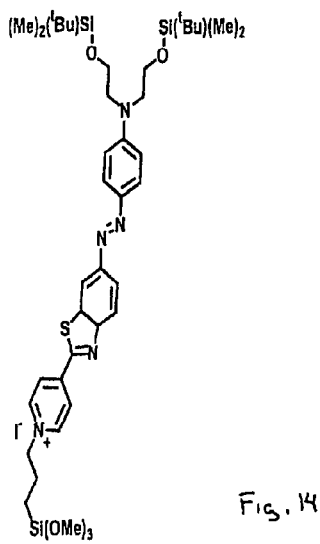
Figure 14:
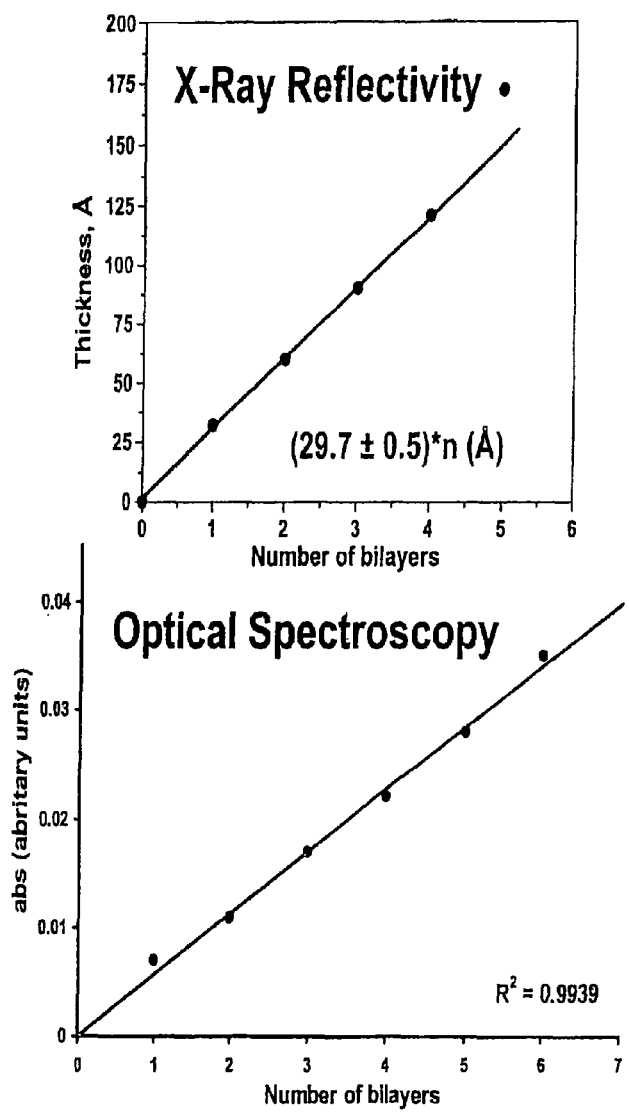

FIG. 14 provides physiochemical data characterizing chromophore F.

Figure 15:
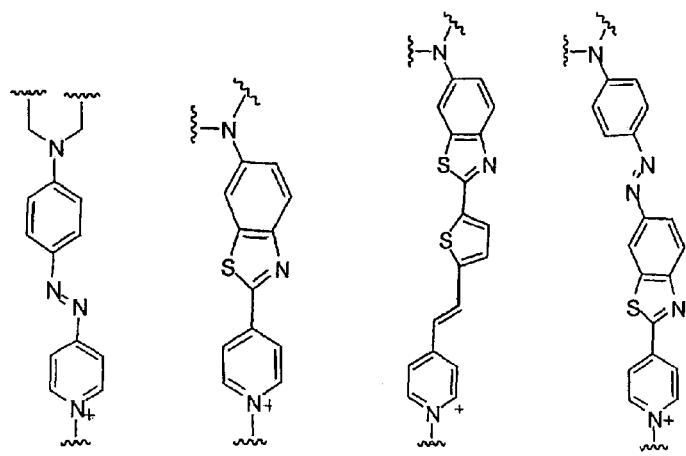

FIG. 15 illustrates other chromophore substructures of the type which can be modified in accordance with this invention and used as described herein.

DETAILED DESCRIPTION OF THE INVENTION

The generally applicable SA method of this invention involves the iterative combination of: (i) covalent chemisorption of polar monolayers of high-fi chromophores (see FIGS. 1 and 2, for instance), (ii) selective removal of tert-butyldimethylsilyl (TBDMS) protecting groups from the surface bound chromophore films with tetra-n-butylammonium fluoride ($^n$Bu$_4$NF) in THF to generate a large density of reactive hydroxyl sites, and (iii) reaction of each 'deprotected' chromophore layer with a heptane solution of octachlorotrisiloxane (150:1 v/v). This 'capping' step deposits a thin polysiloxane film (preferably 8 Å thick) and promotes formation of an acentric multilayer structure since it appears to provide structural stabilization/planarization via interchromophore crosslinking. (W. Lin, W. Lin, G. K. Wong, T. J. Marks, *J. Am. Chem. Soc.* 1996, 118, 8034-8042; W. Lin, S. Yitzchaik, W. Lin, A. Malik, M. K. Durbin, A. G. Richter, G. K. Wong, P. Dutta, T. J. Marks, *Angew. Chem. Int. Ed. Engl.* 1995 34, 1497-1499.) The present liquid-solid interface layer-by-layer construction can be carried out conveniently in a single reaction vessel, whether by batch or another suitable process. The thermally and photochemically robust thin film superlattices exhibit very high second-order responses ($\chi^{(2)}$ as large as ~220 pm/V), adhere strongly to the sodium lime glass, silicon, or indium tin oxide-coated glass (ITO) substrates, and are insoluble in common organic solvents.

With reference to several examples and figures, the present invention includes preparation of 50 and 100 nm thick C-based (see FIGS. 1 and 2) films on sodium lime glass, silicon, indium tin oxide-coated glass (ITO), and SiO$_2$-coated gold, and the integration of these electro-optic materials into modulator-type structures. The thermally and photochemically robust thin film superlattices adhere strongly to the substrates, and are insoluble in common organic solvents (e.g.: toluene, methanol, acetone, tetrahydrofuran, pentane or heptane). The structural regularity of the films has been studied by angle-dependent polarized second harmonic generation (SHG). The polarized angle-dependent second harmonic generation measurements were made in the transmission mode using the $\lambda_o$=1064 nm output wavelength of a Q-switched Nd:YAG laser. The characteristic second harmonic generation interference pattern clearly shows that the quality and uniformity of the organic films is identical on both sides of the float glass substrate. (See FIG. 7)

Examples of the Invention

The following non-limiting examples and data illustrate various aspects and features relating to the compositions, materials, devices and/or methods of the present invention, including the assembly of chromophoric and non-linear optic films and materials as are available through the synthetic methodology described herein. In comparison with the prior art, the present methods and materials/devices provide results and data which are surprising, unexpected and contrary to the prior art. While the utility of this invention is illustrated through the use of several films, materials and/or devices and the molecular components thereof, it will be understood by those skilled in the art that comparable results are obtainable with various other compositions, films and/or devices, commensurate with the scope of this invention.

As shown below, the iterative chemisorptive SA process and the structural regularity of the resulting multilayers have been unambiguously characterized by a full complement of physicochemical techniques: optical transmission spectroscopy, advancing aqueous contact angle (CA) measurements, X-ray photoelectron spectroscopy (XPS), X-ray reflectivity (XRR), and angle-dependent polarized second harmonic generation (SHG). The XRR measurements are crucial in establishing film sub-nanostructural order, thickness, surface roughness, and density.

Toluene, pentane, and heptane were dried over Na/K and distilled under nitrogen. Elemental analyses were carried out at Midwest Microlab, LLC, Indianapolis, USA. The reagent 3-iodo-n-propyltrimethoxysilane was purchased from Gelest, Inc, PA (USA). Octachlorotrisiloxane was prepared according to a literature procedure. (Formation of octachlorotrisiloxane: W. C. Schumb, A. J. Stevens, *J. Am. Chem. Soc.* 1947 69, 726-726.) Silicon wafers (Semiconductor Processing Company) and sodium lime glass were cleaned by immersion in a freshly prepared 'piranha' solution (conc. H$_2$SO$_4$: H$_2$O$_2$ 30%=7:3 v/v) at 80° C. for at least 45 min. This solution is a very strong oxidizing agent and should be handled carefully. After cooling to room temperature, the slides were rinsed repeatedly with de-ionized (DI) water and subjected to an RCA-type cleaning procedure (H$_2$O:H$_2$O$_2$ 30%:NH$_4$OH 5:1:1 v/v/v, sonicated at room temperature for at least 45 min). The substrates were then rinsed with DI water and dried in an oven overnight at 115° C. ITO glass sheets were used for XPS measurements and were purchased from Donnelly Corporation and cut into 2.52×2.54 cm square pieces. The ITO substrates were sequentially washed with isopropyl alcohol, acetone, and methanol in an ultrasonic bath for at least 30 min, and dried in an oven overnight at 115° C. Advancing aqueous contact angles ($\theta_a$) were measured on a standard goniometer bench fitted with a Teflon micrometer syringe at room temperature. All reported values are the average of at least 5 measurements taken on both sides of the glass substrates.

Spectroscopic Analysis. $^1$H NMR spectra were recorded at 300.1 MHz on a Varian Gemini 300 spectrometer. All chemical shifts (δ) are reported in ppm and coupling constants (J) are in Hz. The $^1$H NMR chemical shifts are relative to tetramethylsilane (TMS). The resonance of the residual protons of the deuterated solvent was used as an internal standard (δ2.05 acetone; δ7.26 chloroform). UV-vis spectra were recorded with a Cary 1E spectrophotometer. Polarized angle-depended SHG measurements were made in the transmission mode using the 1064 nm output of a Q-switched Nd:YAG laser operated at 10 Hz with a pulse width of 3 ns. The details of the setup can be found elsewhere. (S. Yitzchaik, S. B. Roscoe, A. K. Kakker, D. S. Allan, T. J. Marks, Z. Xu, T. Zhang, W. Lin, G. K. Wong, *J. Phys. Chem.* 1993 97, 6958-6960.) The data were reproducible over a range of points on the sodium lime glass and ITO samples, and were directly calibrated against those from a Y-cut α-quartz reference. The intensity variation for samples prepared simultaneously was less than 10%. The X-ray reflectivity measurements were performed at Beam Line X23B of the National Synchrotron Light Source at Brookhaven National Laboratory in Upton, N.Y., USA. Details of the data acquisition and analysis procedure were reported previously. (A. Malik, W. Lin, M. K. Durbin, T. J. Marks, P. Dutta, *J. Chem. Phys.* 1997 107, 645-651.) XPS measurements were carried out using the Al Kα source of a VG ESCALAB MKII photoelectron spectrometer at the University of Arizona in Tucson, Ariz., USA.

Example 1

Synthesis of 4[[4-N,N-bis((tert-butyldimethylsiloxy)ethyl)amino]phenyl]azo-1-alkyl-pyridinium iodide salt (alkyl=methyl, n-propyl-3-trimethoxysilane). For C[d2 (FIG. 2). A dry THF solution (15 mL) of 1 (300 mg, 0.583 mmol) and 6.5 equiv of 3-iodo-n-propyltrimethoxysilane (750 μL, 3.81 mmol) was loaded into pressure vessel (25 mL) and heated overnight at 80° C. under Ar. The THF and the excess 1-iodo-n-propyl-3-trimethoxysilane were then removed under high vacuum at 80° C. affording compound 3 as a dark purple solid in quantitative yield. $^1$H NMR analysis of the reaction mixture after 1 h indicated ~15% formation of 2 and starting materials. No other products were observed. Anal. Calcd. for $C_{33}H_{61}I_1N_4O_5Si_3$: Calcd C, 49.24; H, 7.64. Found: C, 49.64; H, 7.35. UV-vis (toluene): $\lambda_{max}$=536 nm. $^1$H NMR (CD$_3$COCD$_3$): δ9.21 (d, $^3J_{HH}$=7.1 Hz, 2H, ArH), 8.25 (d, $^3J_{HH}$=6.7 Hz, 2H, ArH), 8.00 (d, $^3J_{HH}$=9.0 Hz, 2H, ArH), 7.17 (d, $^3J_{HH}$=9.5 Hz, 2H, ArH), 4.83 (t, $^3J_{HH}$=7.3 Hz, 2H, N—CH$_2$), 4.02 (t, J$_{HH}$=5.0 Hz, 4H, OCH$_2$) 3.94 (t, $^3J_{HH}$=5.0 Hz, 4H, NCH$_2$), 3.57 (s, 9H, Si(OCH$_3$)$_3$), 2.11 (m, 2H, CH$_2$), 0.91 (s, 18H, C(CH$_3$)$_3$), 0.78 (t, $^3J_{HH}$=8.4 Hz, 2H, CH$_2$Si), 00.7 (s, 6H, SiCH$_3$). For 3. A THF-d$_8$ solution (1.5 mL) of 1 (60 mg, 0.117 mmol) and MeI (100 μL, 1.61 mmol) was loaded into a 5-mm screwcap NMR tube and heated overnight at 80° C. The resulting dark purple solution was analyzed by $^1$H NMR, showing unreacted MeI and the selective formation of 3. No other products were observed. Compound 3 was obtained quantitatively as a dark purple solid after evaporation of the solvent and the excess of MeI. Anal. Calcd. for $C_{28}H_{49}I_1N_2O_2Si_2H_2O$: Cald: C, 49.56; H, 7.32. Found: C, 49.84; H, 7.62. UV-vis (toluene): $\lambda_{max}$=536 nm. Mp=158° C. $^1$H NMR (CDCl$_3$): δ9.49 (d, $^3J_{HH}$=6.8 Hz, 2H, ArH), 8.08 (d, $^3J_{HH}$=6.9 Hz, 2H, ArH), 7.90 (d, $^3J_{HH}$=9.3 Hz, 2H, ArH), 7.07 (d, $^3J_{HH}$=9.4 Hz, 2H, ArH), 4.65 s, 3H, N—CH$_3$), 3.95 (t, $^3J_{HH}$=5.1 Hz, 4H, OCH$_2$), 3.85 (t, $^3J_{HH}$=4.8 Hz, 4H, NCH$_2$), 0.90 (s, 18H, C(CH$_3$)$_3$), 0.06 (s. 12H, CH$_3$).

Example 2

Figure 3:
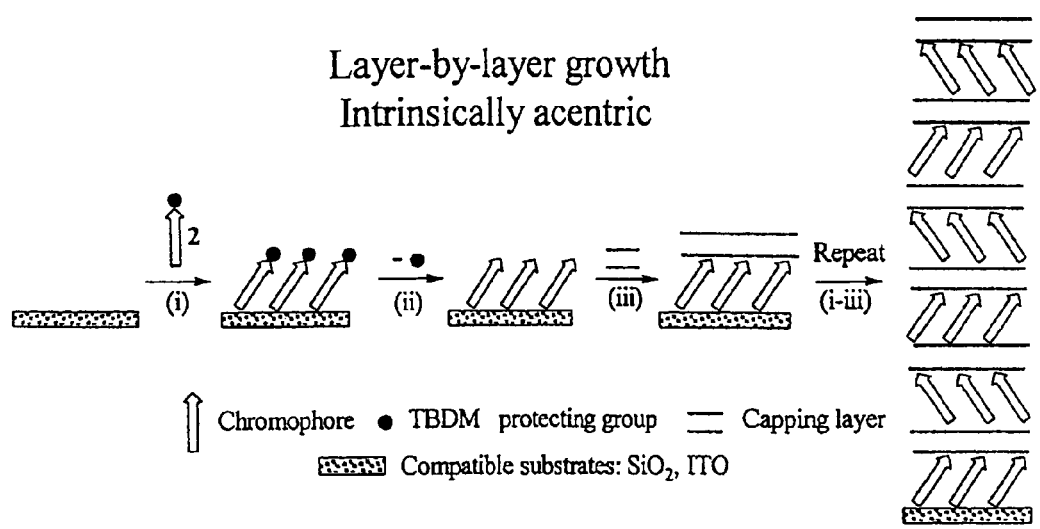
FIG. 3 is a schematic representation of the self-assembly of covalent 2-based chromophoric superlattices by deprotection of the TBDMS-derivatized hydroxyl groups with $^n$Bu$_4$NF and treatment of the resulting film with octachlorotrisiloxane.

Formation of chromophoric superlattices: (i) Self-assembly of Cpd 2 (FIG. 3). Under an Ar atmosphere, the freshly cleaned ITO, sodium lime glass, and/or silicon substrates were loaded into a Teflon sample holder and totally immersed in a dark purple toluene solution of 2 (2.0 mM) for at least 12 h at 90° C. After cooling the Schlenck-type reaction vessel to 25° C., the purple substrates were thoroughly washed with excess toluene and THF, sonicated in acetone for at least 5 min., and dried at room temperature under high vacuum. Longer reaction times (up to 40 h) and other organic solvents for rinsing such as hexane, pentane, or methanol can be used as well. (ii) Deprotection of the TBDMS derivatized hydroxyl moieties. The substrates were immersed in a freshly prepared THF solution of $^n$BuN$_4$F (0.06 mM) for 4 min, washed with excess THF and MeOH, sonicated in acetone for at least 5 min., and dried at room temperature under high vacuum. (iii) Self-assembly of octachlorotrisiloxane. Under an Ar atmosphere, the substrates were immersed in a dry heptane solution of octachlorotrisiloxane (34 mM) for 30 min, washed twice with dry pentane, sonicated in acetone for 15 min, and dried at 115° C. for 10 min. The substrates were cooled to 25° C. under high vacuum or by passing a gentle stream of dry Ar through the reaction vessel before repeating step (i). The chromophore 2 and octachlorotrisiloxane solutions can be used for at least 6 layers.

Example 3

Reaction of chromophore precursor 4-[[4-[N,N-bis((tert-butyldimethylsiloxy)-ethyl)amino]phenyl]azo]pyridine 1 (180 mM) with a 7-fold excess of 1-iodo-n-propyl-3-trimethoxysilane in dry THF at 90° C. results in quantitative formation of the new purple 4-[[(4-(N,N-bis((tert-butyldimethylsiloxy)ethyl)amino]-phenyl]azo]-1-n-propyl-3-trimethoxysane-pyridinium iodide salt 2 (FIG. 2). The TBDMS functionality is used for protection of the hydroxyl groups and is introduced with tert-butyldimethylchlorosilane in the presence of imidazole. Compound 2 was fully characterized by $^1$H NM and UV-vis spectroscopy, and by elemental analysis. Moreover, the analogous 1-methylpyridinium salt (Cpd 3, FIG. 2) can be readily prepared using methyl iodide and has similar spectroscopic properties. For instance, the UV-vis spectra of Cpds 2 and 3 in toluene exhibit a characteristic red-shift of the charge-transfer (CT) band to $\lambda_{max}$=536 nm in comparison to chromophore precursor 1 ($\Delta\delta_{max}$~93 nm).

Example 4

The deprotection of the TBDMS derivatized hydroxyl groups (step ii) was examined by specular XRR, XPS, and CA measurements, which unequivocally reveal the removal of the TBDMS groups. XRR and XPS measurements on a Cpd 2-based monolayer reveal an initial film thickness of 14.5±0.5 Å and a Si/N ratio of 0.75, respectively. Treatment of this monolayer with $^n$Bu$_4$NF (0.06 mM) in THF for 4 min. at 25° C. results in a decrease of: (i) film thickness by ~2.6 Å to 11.9±0.5 Å, and (ii) total number of electrons per unit area by ~16%. XPS measurements on the deprotected monolayer reveal a Si/N ratio of 0.42. Complete removal of the TBDMS group is expected to result in a decrease of the total number of electrons per unit area of ~32% and a Si/N ratio of 0.25. Therefore, our observations indicate the loss of ~50% of the TBDMS protecting groups. Further evidence of hydroxyl functionality deprotection is obtained by CA measurements which show a decrease in $\theta_a$ of ~35° to 51±4°. It is known that in solution, treatment of 2 with $^n$Bu$_4$NF at 25° C. results in quantitative formation of 4-[[4-[N,N-bis(hydroxyethyl)amino]phenyl]azo]pyridine by selective cleavage of both Si—O bonds. The two TBDMS groups of each surface bound chromophore 2 may be chemically inequivalent (i.e., only one TBDMS group is present near the surface), resulting in a sterically less accessible TBDMS moiety for nucleophilic F attack. In support of this hypothesis, XRR reveals that the surface roughness ($\sigma_{film-air}$) decreases by ~1.3 Å to 3.8±0.5 Å upon treatment of a 1-based monolayer with $^n$Bu$_4$NF. Remarkably, the XRR-derived $\sigma_{film-air}$ width of the 'deprotected' 2-based monolayer is comparable to that of a highly ordered self-assembled octadecyltrichlorosilane film on silicon, demonstrating that this new 'protection-deprotection' SA approach results in formation of smooth, well-organized films.

Example 5

The linear dependence of both the optical HOMO-LUMO CT excitation absorbance at $\lambda_{max}$=580 nm and the XRR-derived film thickness on the number of assembled bilayers unambiguously demonstrates that equal populations of uniformly orientated chromophores are deposited in each layer (FIGS. 2a,b). From the slope of the XRR measurements, an average interlayer spacing of 20.52±10.45 Å can be deduced. A maximum in the reflected intensity at K$_z$=0.32 Å$^{-1}$ is observed, which corresponds to a 'Bragg' peak due to scattering from essentially identical individual chromophore layers (FIG. 3). The interlayer spacing calculated from this peak is 19.6±1 Å. Advancing aqueous CA measurements are in accord with expected surface wettabilities and repeat regularly in each step of the layer-by-layer SA process: TBDMS (i), ~86'; ethanolamine (ii), ~50°; —Si—OH (iii), ~25°. (W. Lin, W. Lin, G. K. Wong, T. J. Marks, *J. Am. Chem. Soc.* 1996 118, 8034-8042; W. Lin, S. Yitzchaik, W. Lin, A. Malik, M. K. Durbin, A. G. Richter, G. K. Wong, P. Dutta, T. J. Marks, *Angew. Chem. Int. Ed. Engl.* 1995 34, 1497-1499.)

Example 6

Figure 4:
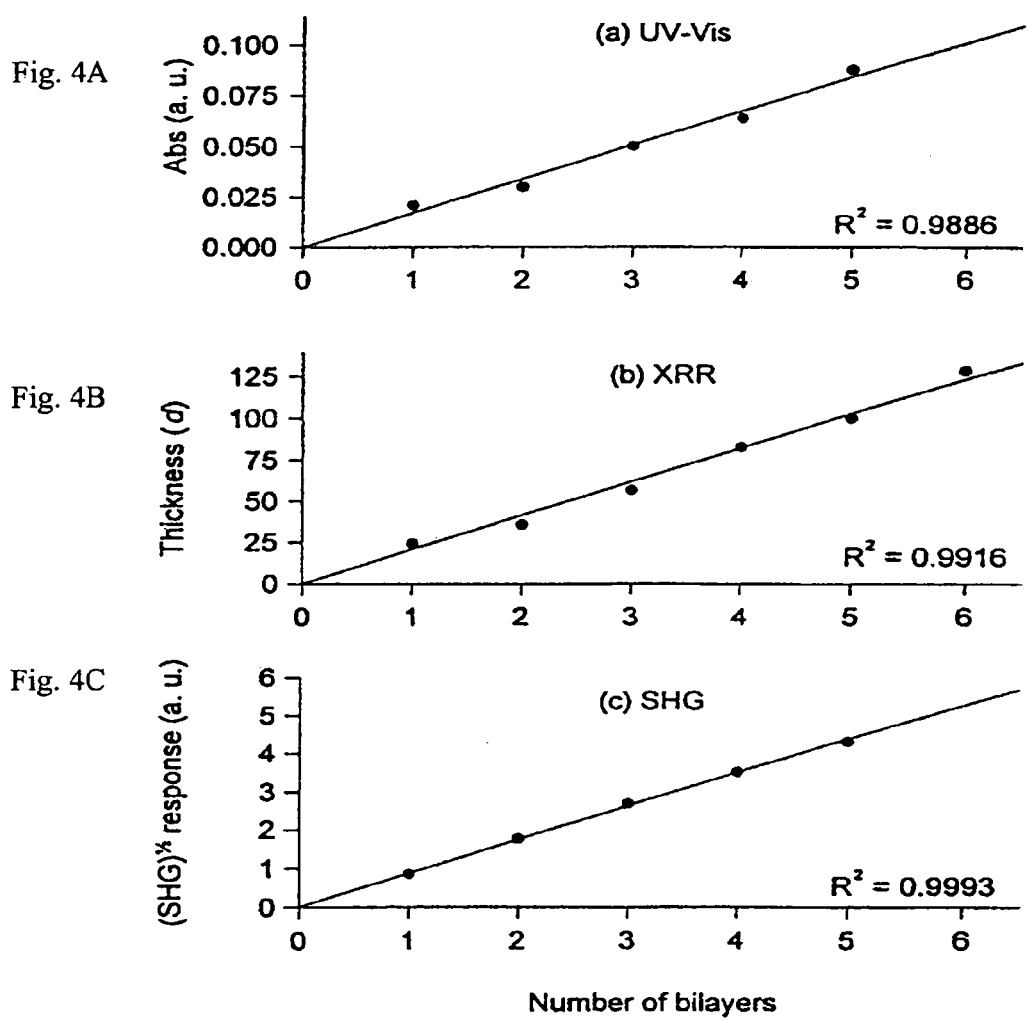

Angle-dependent SHG measurements are an excellent tool for characterization and identification of self-assembled (aminophenyl)azo]pyridinium mono- and multilayer films. Polarized angle-dependent SHG measurements on the present films were made in the transmission mode using the $\lambda_o$=1064 nm output wavelength of a Q-switched Nd:YAG laser. Details of the experimental set-up have been reported. The intensity of the SHG light (I$^{2\omega}$) from a regular multilayered structure should scale quadratically with the number of layers (N. Bloembergen, P. S. Pershan, *Phys. Rev.* 1962 128, 606-622), because the wavelength of the incident light is large compared to the average film thickness (l=20.52(±0.45)×n Å; n=number of layers). The observed linear dependence of the square root of the second harmonic response on the number of layers indicates both uniform chromophore alignment and structural regularity in layer thicknesses (FIG. 2c), which is full in agreement with the UV-vis and XRR data (FIGS. 2a,b; vide supra). The characteristic SHG interference pattern for each layer clearly shows that the quality and uniformity of the organic film is identical on both sides of the float glass substrate and can be fit to eq 1, where $\psi$ is the average orientation angle between the surface normal and the principal molecular tensor component (FIG. 4, n=5). A very large bulk second-order nonlinear susceptibility response, $\chi^{(2)}$zzz~5.3×10$^{-7}$ esu (~220 pm/V), and an average chromophore orientation angle, $\psi$~36°, is obtained by calibrating the SHG data against quartz. An average chromophore surface density N$_S$ of ~2×10$^{14}$ molecules/cm$^2$ is estimated for each layer using the ZINDO-derived molecular hyperpolarizability ($\beta$zzz) value of 983.70×10$^{-32}$ esu at 1064 nm (W. Lin, W. Lin, G. K. Wong, T. J. Marks, *J. Am. Chem. Soc.* 1996 118, 8034-8042), the experimental $\chi^2$ zzz~5.3×10$^{-7}$ esu, and the average interlayer spacing l of 20.52±0.45 Å (eq 2). The estimated N$_S$ value corresponds to an average 'footprint' of about 50 Å$^2$/chromophore.

$$\frac{\chi^{(2)}_{zzz}}{\chi^{(2)}_{zyy}} = 2\cot^2\psi \quad (1)$$

$$N_s = \frac{l\chi^{(2)}_{zzz}}{\beta_{zzz}\chi\cos^3\psi} \quad (2)$$

Example 7

More particularly, a 50 nm thick film can be integrated into a hybrid device-type structure, based on an all-polymer waveguide structure. (See, FIG. 8). The performance of this self-assembled modulator is being characterized. Preliminarily, modulation has been observed upon applying a potential across the two gold electrodes (FIG. 9). A control experiment with a device lacking the self-assembled superlattice did not exhibit this phenomenon. The switching potential is currently rather high (~280 V) for practical applications. Modulation at lower potentials can be achieved in accordance with the present invention by (i) replacing the fluorinated Cytop™ layer with a conducting polymer or transparent conducting oxide (TCO) film, (ii) increasing the self-assembled film thickness, (iii) incorporation of ultra high-$\beta$ chromophore-based superlattices, and (iv) improving the device processing procedure. The transparency of the prototype electro-optic modulator is highly angle-dependent on the polarization of the input light (FIG. 10). Maximum transmission is observed at 15° and 130°, respectively.

Example 8

The iterative chemisorptive self-assembly process of this invention and the structural regularity of the resulting E-based multilayers (FIG. 11) have been unambiguously characterized by a full complement of physicochemical techniques: optical transmission spectroscopy, advancing aqueous contact angle measurements, X-ray photoelectron spectroscopy, X-ray reflectivity, and angle-dependent polarized second harmonic generation.

F-based monolayers (FIG. 11) have been obtained and identified by optical transmission spectroscopy, aqueous contact angle measurements, X-ray reflectivity, and angle-dependent polarized second harmonic generation measurements. Remarkably, the electro-optic response is about 3-4 times than that of a similar E-based film ($\chi^{(2)}$ is estimated to be >600 pm/V) (FIG. 12).

Example 9

The following step-wise procedure is provided with respect to the synthetic sequence illustrated in FIG. 13. All reactions were carried out under inert atmosphere. Solvents were dried, distilled, and degassed before use. The compounds were characterized using conventional analytical techniques.

Step 1. An aqueous solution of $NaNO_2$ (0.45 g, ~5 mL) was added portion wise to a slurry of 6-amino-2-pyridin-4-yl-benzothiazole (1.42 g, 6.26 mmol) in $H_2SO_4$ (25 mL, 4 M). The mixture became clear and was added to a slurry of N-phenyldiethanolamine (1.1 g, 6.1 mmol) in 50 mL $H_2O$ at 0° C. A dark red solution formed instantaneously and was immediately neutralized with aqueous NaOH (9 g, 20 mL). After subsequent stirring at room temperature for 1½ h a dark red precipitate was obtained by filtration. TLC (ethyl-actetate) indicated the presence of a new product and N-phenyldiethanolamine. Recrystallization from iso-propyl alcohol yielded the pure dihydroxy product (1.15 g, 45%).

Step 2. The dihydroxy compound (0.46 g, 1.1 mmol) was reacted with (tert-butyl)dimethyl-chlorosilane (0.63 g, 4.2 mmol) and imidazole (0.63 g, 9.3 mmol) in 5 mL anhydrous THF for 7 h under Ar. TLC (ethyl-acetate) after 1 h indicated that no starting material remained. The crude was dried under high vacuum overnight at room temperature, dissolved in hexane (100 mL) and washed (4×) with $H_2O$ (5 mL) till neutral. The hexane was removed by rotavap and the orange disilyl material was dried under high vacuum (0.11 g, 16%).

Step 3. A dry THF solution (7 mL) of the disilyl compound (100 mg, 0.15 mmol) and 6.5 equiv of 3-iodo-n-propyl-trimethoxysilane (200 µL, 1.27 mmol) were loaded into a pressure vessel (25 mL) and heated overnight at 90° C. under Ar. The THF and excess 1-iodo-n-propyl-3-trimethoxy-silane were then removed under vacuum at 80° C. The resulting solid was washed with dry pentane. The ammonium product was dried under high vacuum (65 mg, 0.07 mmol).

While the principles of this invention have been described in connection with specific embodiments, it should be understood clearly that these description are added only by way of example and are not intended to limit, in any way, the scope of this invention. Other advantages and features will become apparent from the claims hereinafter, with the scope of those claims determined by the reasonable equivalents as understood by those skilled in the art.

What is claimed:

1. A chromophore compound of a structural formula (Ch)$XR_n$ wherein (Ch)X is a chromophore substructure comprising a quaternary pyridinium moiety and a terminal silyl moiety, and X is a heteroatom; R comprises a silyl moiety; and n is the number of said R moieties meeting the valence requirement of said heteroatom.

2. The compound of claim 1 wherein Ch comprises a high-β chromophore substructure.

3. The compound of claim 2 wherein said chromophore substructure is selected from the azo chromophore substructures

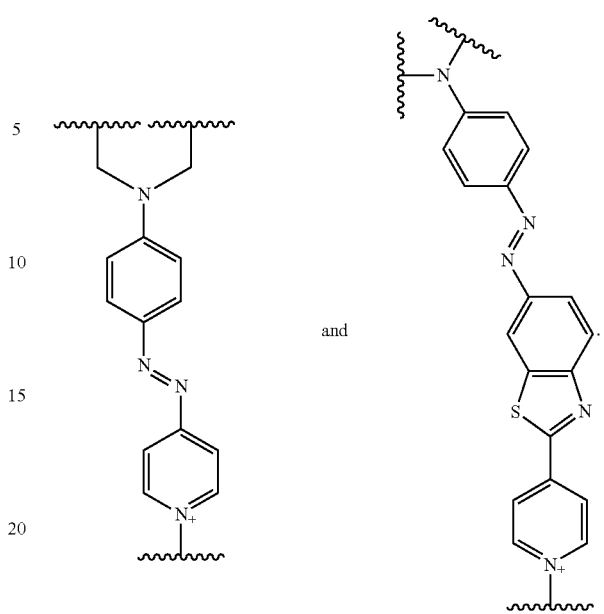

and

4. The compound of claim 3 wherein R is a tert-butyldimethylsiloxyalkyl moiety.

5. The compound of claim 1 wherein R is a trialkylsiloxyalkyl moiety.

6. The compound of claim 5 wherein R is a tert-butyldimethylsiloxyalkyl moiety.

7. The compound of claim 5 wherein X is N and n is 2.

8. The compound of claim 1 coupled to a polysiloxane.

9. The compound of claim 8 wherein said polysiloxane is octachlorosiloxane.

10. The compound of claim 1 incorporated into a device.

11. A chromophore compound of a structural formula (Ch)$NR_2$ wherein Ch is a chromophore substructure comprising a quaternary pyridinium moiety and a terminal silyl moiety; and R is a silyl moiety.

12. The compound of claim 11 wherein R is a trialkylsiloxyalkyl moiety.

13. The compound of claim 12 wherein R is a tert-butyldimethylsiloxyalkyl moiety.

14. The compound of claim 11 wherein said chromophore substructure is selected from the azo chromophore substructures of

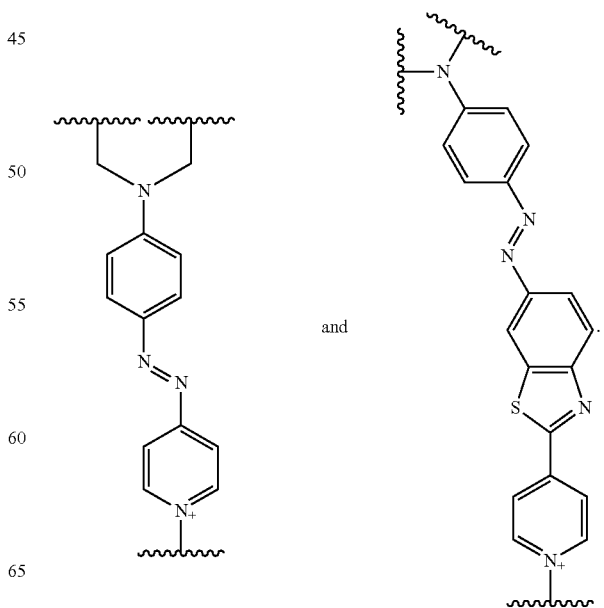

and

15. The compound of claim 14 wherein R is a tert-butyldimethylsiloxyalkyl moiety.

16. The compound of claim 11 coupled to a polysiloxane.

17. The compound of claim 16 wherein said polysiloxane is octachlorosiloxane.

18. The compound of claim 17 incorporated into a device.

19. The compound of claim 11 assembled into a chromophore molecular layer, each said molecular component of said chromophore molecular layer comprising opposed terminal silyl moieties.

20. The compound of claim 19 assembled into a device structure.

* * * * *

UNITED STATES PATENT AND TRADEMARK OFFICE
CERTIFICATE OF CORRECTION

| | | |
|---|---|---|
| PATENT NO. | : 7,972,542 B1 | |
| APPLICATION NO. | : 12/806560 | |
| DATED | : July 5, 2011 | |
| INVENTOR(S) | : Marks et al. | |

It is certified that error appears in the above-identified patent and that said Letters Patent is hereby corrected as shown below:

In the specification:

Column 5, line 6:
"2=580 nm" should read --$\lambda$=580 nm--

Column 5, line 41:
"high-fi chromophores" should read --high-$\beta$ chromophores--

Column 7, lines 37-38:
"4[[4-N,N-bis((tert-butyldimethylsiloxy)ethyl)amino]phenyl]azo-1-alkyl-pyridinium" should read
--4-[[4-[N,N-bis((tert-butyldimethylsiloxy)ethyl)amino]phenyl]azo-1-alkyl-pyridinium--

Signed and Sealed this
Fifteenth Day of November, 2011

David J. Kappos
*Director of the United States Patent and Trademark Office*